(12) United States Patent
Jaeger

(10) Patent No.: US 6,832,620 B2
(45) Date of Patent: Dec. 21, 2004

(54) APPARATUS FOR DOSING LUBRICANT INTO AN AIR LINE

(75) Inventor: Siegfried Jaeger, Lindau (DE)

(73) Assignee: Lindauer Dornier Gesellschaft mbH, Lindau (DE)

( * ) Notice: Subject to any disclaimer, the term of this patent is extended or adjusted under 35 U.S.C. 154(b) by 400 days.

(21) Appl. No.: 10/077,098

(22) Filed: Feb. 15, 2002

(65) Prior Publication Data

US 2002/0112759 A1 Aug. 22, 2002

(30) Foreign Application Priority Data

Feb. 17, 2001 (DE) .......................................... 101 07 558

(51) Int. Cl.⁷ .......................... B67D 5/46; F01M 11/10; F16N 13/16; F16N 27/00; F16N 29/02
(52) U.S. Cl. ...................... 137/237; 73/1.72; 73/1.74; 73/861; 137/487.5; 137/554; 137/557; 184/6.23; 184/7.4; 184/55.2; 222/56; 222/262; 222/309; 340/606; 340/611; 417/63; 417/401; 417/553; 700/282; 700/283; 702/47; 702/55; 702/57; 702/100
(58) Field of Search ............................ 137/486, 487.5, 137/554, 557, 209, 237; 73/1.72, 1.74, 861; 184/29, 6.23, 7.4, 55.2; 340/606, 611; 417/553, 63, 274, 275, 401; 700/282, 283; 702/45, 47, 52, 53, 55, 57, 100; 222/52, 56, 262, 282, 309

(56) References Cited

U.S. PATENT DOCUMENTS 3,693,757 A * 9/1972 Callahan et al. ............. 184/7.4

| 3,841,438 A | | 10/1974 | Tine et al. |
| 4,105,095 A | * | 8/1978 | Thrasher, Jr. ............... 184/55.2 |
| 4,364,452 A | | 12/1982 | Crago |
| 4,472,111 A | * | 9/1984 | Yamatani ..................... 184/7.4 |
| 5,038,893 A | * | 8/1991 | Willner et al. ............... 184/7.4 |
| 5,092,746 A | | 3/1992 | Henke |
| 5,961,299 A | | 10/1999 | Gruett et al. |
| 6,053,285 A | * | 4/2000 | Reeves ....................... 184/6.23 |
| 6,099,270 A | * | 8/2000 | Wech .......................... 184/7.4 |

FOREIGN PATENT DOCUMENTS

WO    WO 01/33133    5/2001

* cited by examiner

Primary Examiner—George L. Walton
(74) Attorney, Agent, or Firm—W. F. Fasse; W. G. Fasse

(57) ABSTRACT

An apparatus for dosing lubricant into a compressed air flow includes a lubricant container, a pneumatically operated lubricant pump, an injection channel, a non-return valve interposed between the outlet of the pump and the injection channel, and an electronic sensor cooperating with or coupled to the non-return valve so that the sensor emits an electrical signal responsive and corresponding to the stroke travel of the non-return valve. When the pump carries out a lubricant injection cycle, the pressurized lubricant pushes open the non-return valve, flows into the injection channel and from there into a main channel through which compressed air flows. The travel of the valve is sensed by the sensor, and the sensor signal indicates whether the lubricant injection was proper or faulty, e.g. if the proper amount of lubricant was injected.

20 Claims, 3 Drawing Sheets

APPARATUS FOR DOSING LUBRICANT INTO AN AIR LINE

PRIORITY CLAIM

This application is based on and claims the priority under 35 U.S.C. §119 of German Patent Application 101 07 558, filed on Feb. 17, 2001, the entire disclosure of which is incorporated herein by reference.

FIELD OF THE INVENTION

The invention relates to an apparatus for dosing a lubricant such as oil, grease or the like into a compressed air line, whereby the apparatus includes a lubricant container, a lubricant pump, and at least one valve.

BACKGROUND INFORMATION

A great variety of different dosing devices are known in the prior art, for dosing or dispensing small controlled quantities of lubricant into a compressed air line, for example. Such dosing devices are also known as injection oilers or minimum quantity dosing systems. The general technology of these systems is based on an air injection and spraying system, wherein a predetermined quantity of a lubricant is injected into a compressed air flow, by which the lubricant is then sprayed or blown with a suitable pressure onto the machine part or other component that is to be lubricated. Such lubricant dosing devices are used for a variety of different applications in a variety of different fields. Examples of dosing devices of this kind are sold commercially in ordinary trade by the company Willy Vogel AG, Berlin, Germany.

All conventionally available dosing systems of the above described general type usually have many features and parameters that can be adjusted by the user or operating personnel, for example offering the possibility of adjusting the quantity of lubricant to be injected during each dosing cycle. In view of this broad adjustability, it is possible to make faulty or improper adjustments, and to mechanically tamper with the device. That very easily leads to operating errors, so that a reliable and proper lubricating operation cannot be ensured. Moreover, monitoring and controlling the proper functionality, and recognizing any arising errors or faults during the lubricating process is not possible, or is only possible with considerable technical efforts.

Overall, the handling, error monitoring, identification and correction, the great number of individual parts, and the complicated arrangement and connection of the various lines or conduits of such conventionally available systems are not suitable for reliably achieving a minimum error rate. Depending on the particular application, a defect of the dosing system which causes an improper or inadequate lubrication can lead to faulty operation or even a total failure and breakdown of the apparatus or machine that is to be lubricated by the dosing system.

SUMMARY OF THE INVENTION

In view of the above, it is an object of the invention to further develop and improve a lubricant dosing apparatus of the above described general type, to achieve a simpler and better operating comfort, and to reliably avoid faulty and erroneous operation thereof. Another, more particular object of the invention is to provide a reliable indication of the proper or improper operation of the dosing apparatus, in a simple manner. The invention further aims to avoid or overcome the disadvantages of the prior int art, and to achieve additional advantages, as apparent from the present specification.

The above objects have been achieved according to the invention in a lubricant dosing apparatus for providing a dosed supply of a lubricant into a pressurized air flow. The apparatus includes a lubricant container, a pneumatically actuated lubricant pump, a lubricant injection channel selectively communicating with an outlet of the lubricant pump, a non-return or one-way check valve interposed between the outlet of the lubricant pump and the injection channel, and an electronic sensor that cooperates or is coupled (e.g. electromagnetically or mechanically) with the non-return valve in such a manner so that the sensor emits an electrical signal responsive to the position or movement of the non-return valve through a defined stroke. When the lubricant pump injects a properly dosed or metered quantity of the lubricant through the pump outlet, the pressurized lubricant temporarily pushes against and opens the non-return valve, causing this valve and particularly its valve stem to move through a resulting stroke with a resulting motion pattern and duration. The motion of the non-return valve stem is indicated by the electrical signal emitted by the sensor, and can be evaluated, e.g. by comparing it to proper signal level thresholds, time points, and/or durations, to determine whether the lubricant dosing operation was carried out properly, i.e. within proper parameters. A faulty operation recognized by this signal evaluation can be used to trigger a fault indication to operating personnel, or to shut down the system.

Thus, the basic feature of the invention is that the non-return valve is coupled with the electronic sensor in such a manner, so that the sensor will emit a corresponding electrical signal when the non-return valve carries out a defined stroke motion. The electrical signal is provided to a control and/or evaluating unit to be evaluated therein, so as to indicate either a successfully and properly completed lubricant dosing and injection cycle, or a fault condition.

In a preferred embodiment, the lubricant pump is embodied as a piston pump, with a dosing needle that is axially slidably guided in a needle bushing, and that withdraws a defined quantity of the lubricant out of the lubricant container via a throughflow port, and then injects this dosed quantity of lubricant into the injection channel, on each working stroke of the pump. The respective dosed and injected quantity of the lubricant is set and fixed (e.g. by the dimensions of the bore of the needle bushing and the stroke travel distance of the dosing needle), for example by the manufacturer of the device. Therefore, the per-stroke injection quantity is not readily externally adjustable (but would require, e.g., replacing the needle and the needle bushing with differently dimensioned components). Thereby, the possibility of an erroneous adjustment of the dosing quantity is avoided. Instead, the desired supply quantity of the lubricant can be electronically controlled, for example by controlling the frequency of dosing injection cycles.

The piston of the lubricant pump is pre-stressed by a compression spring in its neutral or resting position. The spring constant of this compression spring is selected in such a manner, so that the piston can only be moved from the neutral resting position into the working position (or "cocked" position), against the force of the spring, once a sufficiently high pre-defined air pressure has been applied to the piston. Then, when the supply of pressurized air is discontinued and the pressure is released, the spring force will return the piston from the working position to the resting position, thereby carrying out a working or injection stroke. Due to this spring-force actuation of the piston during the injection stroke, a constant injection pressure will always be ensured and (unlike air-pressure actuated pumps) will not be dependent on the pressure of the compressed air system, which is subject to fluctuations and varying adjustments. This, together with the abovementioned fixed prescribed lubricant quantity supplied in each injection cycle ensures a relatively consistent stroke of the non-return valve, as long as the viscosity of the lubricant does not vary substantially.

Moreover, since the supplied compressed air must have a sufficient pressure to overcome the constant spring force, for drawing back the lubricant pump piston, a leak or pressure drop in the compressed air system will be readily indicated and recognized in the inventive apparatus, as follows. With an inadequate actuating pressure, the piston of the lubricant pump would not have been drawn back (or "cocked") at all, or would only have been drawn back partially. As a result, the injection stroke would not be carried out at all or only partially, whereby particularly the non-return valve would not move at all or would move improperly, e.g. with a stroke travel that is too short. Any such faulty or non-existent motion of the non-return valve at a time when the valve is expected to carry out its normal stroke travel is detected and indicated by the sensor.

In a further preferred embodiment, the non-return valve has a protruding plug that protrudes from the valve's valve disk or valve head, so that it reaches into and additionally closes the bore of the dosing needle bushing. Thereby, the length and diameter of this projection or protruding plug determine the minimum stroke travel of the non-return valve for opening the bore of the dosing needle bushing.

According to the invention, the electronic sensor may be any conventionally available sensor that would be suitable for sensing the position or travel of the non-return valve, or particularly its valve stem. Preferably, the sensor is a conventional commercially available inductive or capacitive proximity sensor. The output signal of the sensor can be evaluated in any conventionally known or available evaluation circuit, for example by comparing the output signal to signal level thresholds, or signal durations, or signal waveforms, at each respective time during an injection cycle when a specified signal would be expected based on the expected proper travel or stroke of the non-return valve. By monitoring the stroke travel (or lack thereof) of the non-return valve in this manner, the sensor can directly or indirectly recognize a defect or failure of the pressurized air system supplying air to the dosing apparatus, an empty lubricant supply container, an insufficient or missing quantity of the injected lubricant, and an other fault or complete omission of a respective injection cycle.

Preferably, the injection channel of the apparatus communicates into a main channel, to which compressed air may be supplied through a pneumatic valve. Then, the dosed quantity of lubricant that has been injected through the injection channel into the main channel is blown out of the main channel through at least one outlet, to which an air line or the like may be connected. Thereby, the dosed quantity of lubricant is supplied into the air line, through which it is further conveyed to the machine part or other component which is to be lubricated. In a preferred embodiment of the invention, the operation of the lubricant pump and the supply of compressed air to blow the lubricant out of the main channel can be carried out independently of each other. For example, the pneumatic valve supplying compressed air into the main channel, and the valve supplying compressed air to operate the lubricant pump can be operated and actuated independently. Thus, it is possible to carry out a single lubricant injection cycle to inject a single dose of lubricant into the main channel, followed by several pneumatic blowing cycles. Alternatively, several lubricant injection cycles can be carried out before carrying out a single pneumatic blowing cycle. Thereby, the amount and timing of the lubricant quantity to be provided through the outlet air line or lines can be controlled and adjusted.

A further detail of the invention provides a specialized filling armature or fitting through which the lubricant tank can be filled with lubricant. This helps to avoid damage or failure of the dosing apparatus that would result by filling the container with an incorrect or unsuitable lubricant. In other words, the filling armature or fitting is the only opening through which lubricant may be filled into the lubricant supply container, and this fitting is specially configured so that it only fits a corresponding supply nozzle of the supply of the appropriate lubricant.

The overall construction of the dosing apparatus is selected, designed and executed, using relatively few fabricated parts, with rather small tolerances, so that a high base line accuracy of the dosing volume is achieved. The injected lubricant quantity is fixedly set to a constant amount that will always remain the same. Faulty adjustments of the dosing quantity are no longer possible. All functions of the dosing system are controllable electronically, for example by means of appropriate software, which generates electronic signals to control the pump actuating valve and the pneumatic supply valve of the apparatus. The dosing apparatus includes only a single central pressurized air connection, which supplies the required pressurized air to all functional groups of the dosing apparatus. This also simplifies the handling and connecting of the dosing apparatus.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

Figure 1:
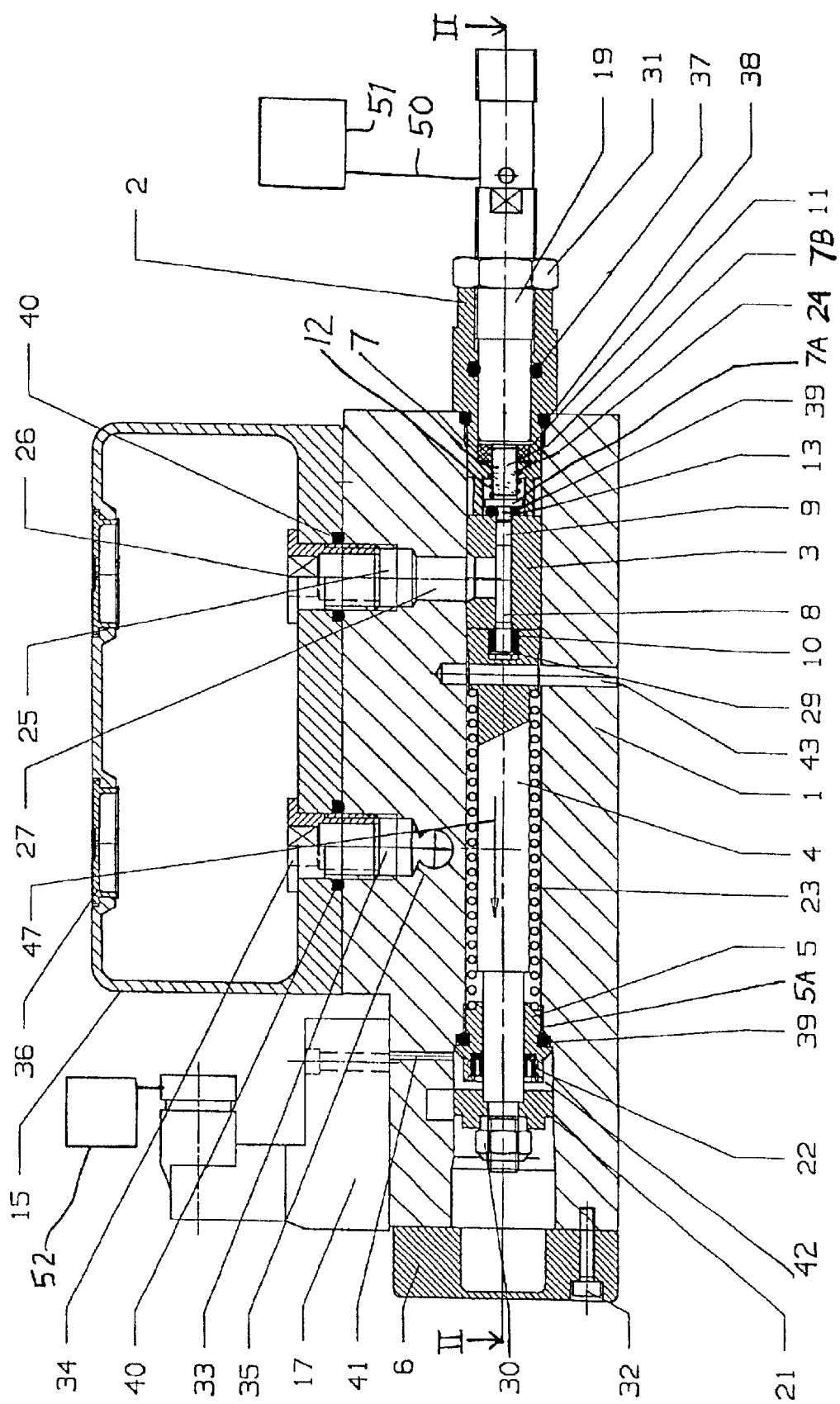
FIG. 1 is a sectional side view of a lubricant dosing apparatus according to the invention, with the piston of the lubricant pump in its forward rest position.
Figure 2:
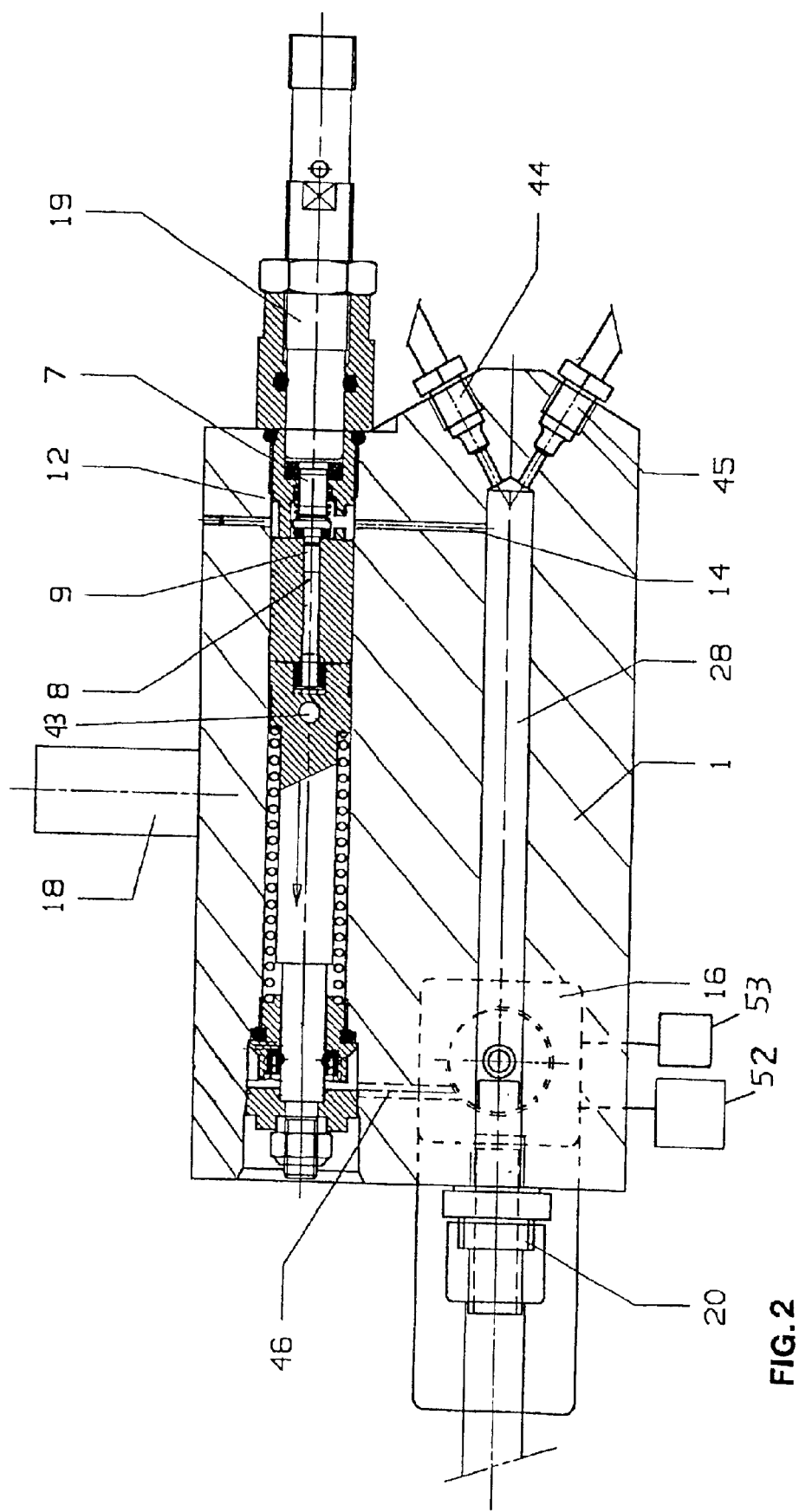
FIG. 2 is a sectional top view of the dosing apparatus along the section plane II—II of FIG. 1, particularly showing the connection of the lubricant injection channel to the compressed air main channel.

As shown in FIGS. 1 and 2, the inventive lubricant dosing apparatus comprises a housing 1, which is preferably made of metal. A container 15, which can be filled with a liquid or viscous flowable lubricant (e.g. oil, grease, silicone based lubricant, etc.) is plugged or mounted onto the housing 1. On the bottom side thereof, the container 15 has two mouth pieces 26, 34, which are plugged into corresponding fitting openings 25 and 33 of the housing 1. This forms the plug-in connection as well as the mounting support of the container 15 on the housing 1. Respective O-rings 40 are provided to form a seal between the container 15 and the housing 1, respectively around the mouth pieces 26, 34.

Filling of the container 15 with the lubricant is carried out through a filling armature or fitting 18 (see FIG. 2) provided on the housing 1. The fitting 18 is connected through a throughflow port 35 to the opening 33, and thus to the mouth piece 34 of the container 15, whereby the lubricant is filled through the mouth piece 34 into the container 15. The container 15 further has at least one lid or cover 36 with a suitable air vent, for venting the interior of the container 15 while it is being filled with lubricant, and while the lubricant is being dispensed from the container.

The housing 1 has an axially extending cylinder bore therein, in which a dosing pump is formed or arranged. A mounting hole or bore 43 is provided in the housing 1 for assembling or mounting the apparatus. The dosing pump comprises a pneumatic piston 21 that is arranged in the bore in the housing 1, and that is pre-stressed and biased toward an initial or resting position by a compression spring 23. The piston 21 is connected to a first end of a piston rod 4 that is slidingly supported in a rod bushing 5, which in turn is screwed or threadingly engaged into a threading 5A in the bore of the housing 1. A seal ring 22 provides a seal between the piston rod 4 and the rod bushing 5, and a nut 30 secures the piston 21 onto the first end of the piston rod 4. The compression spring 23 bears against and biases the second end of the piston rod 4 relative to the rod bushing 5. A dosing needle 8 is connected to the second end of the piston rod 4 opposite the piston 21, and in turn is axially slidably guided in the bore 9 of a needle bushing 3. One end of the dosing needle 8 is supported in a support bushing 10 in the second end of the piston rod 4, and is secured there by a securing ring 29.

An opening through the wall of the needle bushing 3 communicates the bore 9 of the needle bushing 3 with a throughflow port 27 of the housing 1, which further communicates with the opening 25, and thus with the mouth piece 26 of the lubricant container 15. Lubricant can flow from the container 15 through the mouth piece 26 and the throughflow port 27 into the bore 9 of the needle bushing 3, once the bore is opened or cleared by the pulled-back dosing needle 8. However, in the initial resting position of the piston 21 and the piston rod 4, the dosing needle 8 is in a position blocking the throughflow port 27, so that the lubricant cannot flow into the bore 9 of the needle bushing 3. As will be described below, the axial stroking motion of the dosing needle 8 along with the stroking motion of the piston 21 and piston rod 4 will correspondingly pull the dosing needle 8 back to clear or open the throughflow port 27, to draw or flow the lubricant into the bore 9 of the needle bushing 3, which then acts as a dosing or metering chamber.

To drive the piston pump, the working chamber 42 thereof is selectively supplied and pressurized with compressed air delivered from a controllable pneumatic valve 17 through an air channel 41. The end of the working chamber 42 and of the overall dosing pump adjacent to the piston 21 is closed by a lid or cover 6, which is removably secured to the end of the housing 1 at this location by one or more screws 32.

An axial end opening of the bore 9 of the needle bushing 3 opposite the dosing needle 8 and the piston rod 4 is selectively closed by the valve head or disk 7A of a non-return or one-way check valve 7. The valve head 7A is pressed against the needle bushing 3 by a compression spring 24. An O-ring 39 is sealingly arranged in contact between the valve head 7A and the needle bushing 3. A protrusion or protruding plug 13 is provided on and projects from the valve head or disk 7A. In the normal closed resting position of the non-return valve 7, the protruding plug 13 extends into the end of the bore 9 of the needle bushing 3 and (in addition to the valve disk 7A and O-ring 39) additionally serves to close or plug this axial end opening of the bore 9.

The non-return valve 7 further includes a valve shaft or stem 7B that axially extends from the valve disk 7A opposite the plug 13, i.e. away from the dosing needle 8. A proximity sensor 19 is arranged coaxially relative to the valve stem 7B, so as to detect the axial movement and position of the valve stem 7B and to emit a corresponding electrical signal responsively thereto, via a conductor 50 leading to an evaluating unit 51. The valve shaft or stem 7B is axially slidably guided in a ring washer or annular spacer disk 11, of which the selected axial thickness determines the minimum spacing distance between the sensor 19 and the non-return valve 7. The axial spacing distance between the sensor 19 and the non-return valve 7 is thus adjustable, for example by selecting and exchanging the annular spacer disk 11 with a different disk having a different axial thickness. Furthermore, the non-return valve 7 and the sensor 19 are both held in a sensor adapter 2, whereby the sensor 19 is screwed or threadingly connected with the sensor adapter 2 by means of a collar nut 31. It is also possible to adjust the position of the sensor 19, if desired, via this nut 31 (e.g. embodied to include an adjusting nut and a lock nut), so as to adjust the above mentioned spacing distance relative to the non-return valve 7. O-rings 37 and 38 are respectively provided to form a seal between the adapter 2 and the sensor 19, and between the adapter 2 and the housing 1.

The lubricant can flow selectively past the non-return valve 7 from the dosing chamber formed by the bore 9 in the needle bushing 3, into a valve chamber or space 12 surrounding the non-return valve 7. This valve chamber or space 12 in turn communicates into an injection channel 14, which further communicates into a main channel 28 that is axially arranged in the housing 1 parallel to the pump bore (see also FIG. 2). A pneumatic valve 16 is connected to one end of the main channel 28, for controlledly and selectively supplying pressurized air into the main channel 28.

Adjacent and connected to the pneumatic valve 16 is a pressurized air connection 20, which is the single master air port at which the dosing apparatus is connected to a supply of compressed air. Thereby, all of the required compressed air can be supplied centrally to the apparatus, for satisfying all of the compressed air needs. A further air overflow channel 46 is connected from the pressurized air connection 20, or particularly the pressurized air supply side of the pneumatic valve 16, to the pneumatic valve 17, so that the pneumatic valve 17 also receives its supply of pressurized air. At the opposite end of the main channel 28, at least one outlet 44, 45 is connected to a respective air hose or conduit. The pressurized air carries the injected lubricant from the main channel 28 through the outlets 44, 45 and the connected air hoses, pipes or conduits to the machine parts or other components or locations at which the lubricant is to be applied.

Figure 3:
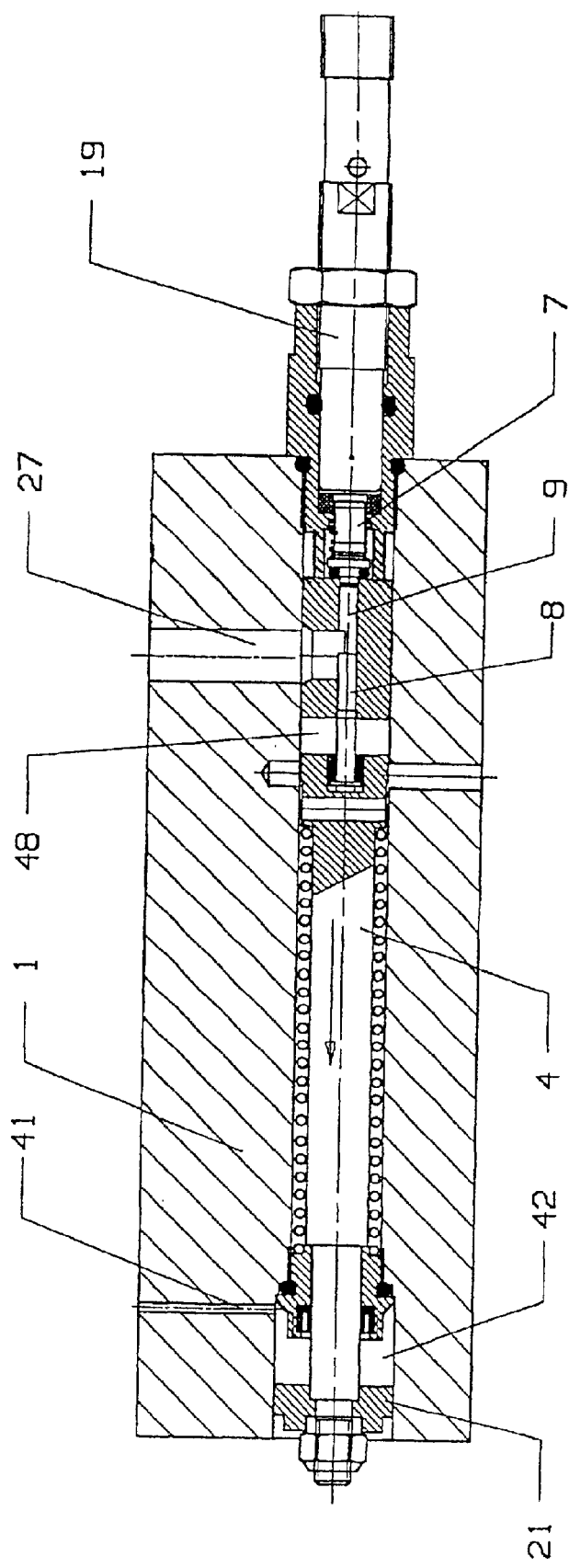
FIG. 3 is a sectional side view of the dosing apparatus according to FIG. 1, but with the piston of the lubricant pump in the pulled-back working position.

Now the operation of the inventive dosing apparatus will be described in connection with the drawings, whereby FIG. 1 shows the initial resting position, and FIG. 3 shows the open working position in which a dose or charge of lubricant is filled into the dosing chamber formed in the bore 9 of the needle bushing 3.

To begin a lubricant injection cycle from the resting position shown in FIG. 1, an electrical signal, e.g. released or generated by a suitable control unit 52, is applied to the pneumatic valve 17 so as to actuate and open the valve so that pressurized air flows therethrough via the air channel 41 into the working chamber 42 of the piston pump. The pressurized air in the working chamber 42 pushes the piston 21 and therewith the connected piston rod 4 toward the left in the direction of arrow 47 in FIG. 1, against the bias force of the compression spring 23. More particularly, the spring constant of the compression spring 23 is selected in such a manner so that the pneumatically driven piston 21 will only be moved from the resting position of FIG. 1 into the open working position of FIG. 3 when a pre-defined minimum required pressure, for example 4 bar, is supplied through the pneumatic valve 17 into the working chamber 42 to bear against the piston 21. When this minimum pressure is reached or exceeded, the piston 21 and connected components will move to the left into the open working position as shown in FIG. 3, whereby the resultant stroke travel of the piston arrangement is labeled with the reference number 48 in FIG. 3.

Thereby the dosing needle 8 is simultaneously moved in the same direction, so that it is pulled back and opens the throughflow port 27 into the bore 9 of the needle bushing 3. The lubricant flows through the throughflow port 27 into the bore 9, and there is stopped by the non-return valve 7, which is still closed. The area of the bore 9 between the free end of the dosing needle 8 and the non-return valve 7 is filled with lubricant. At this time the apparatus is in a ready condition, i.e. ready to carry out an injection of a dosed or metered quantity of lubricant. The control unit 52 applies (or discontinues) an electrical signal to the pneumatic valve 17 to discontinue the supply of compressed air, and instead to vent the valve 17, i.e. to suddenly and rapidly vent the compressed air located in the working chamber 42 out through the air channel 41. Due to the return force applied by the compression spring 23, the piston arrangement including the interconnected piston 21, piston rod 4, and dosing needle 8 rapidly moves (i.e. shoots or jerks) back toward the right into its initial resting position shown in FIG. 1.

This motion of the dosing needle 8 exerts a corresponding force and pressurizes the lubricant present in the bore 9 of the needle bushing 3 against the valve disk 7A of the non-return valve 7, which has been closed up to this time. However, due to the pressure of the lubricant, the valve 7 now opens, and the lubricant is injected under pressure past the open valve 7 into the valve chamber or space 12 and from there into the injection channel 14 and further into the main channel 28. As the dosing needle 8 is moving from the fully retracted position toward the right, i.e. from the position of FIG. 3 to the position of FIG. 1, while the front end of the needle 8 traverses the opening of the throughflow port 27, the lubricant in this area can at least partially escape back into the throughflow port 27. However, once the front end of the dosing needle 8 has completely traversed and thus closed the opening of the throughflow port 27, a sealed dosing or metering chamber is formed in the remaining portion of the bore 9 of the needle bushing 3 between the free end of the dosing needle 8 and the non-return valve 7. Thus, the length and the diameter of this portion of the bore 9, as well as the maximum penetration depth of the dosing needle 8 into this dosing chamber determine the dosed or metered quantity of lubricant that will be injected during each injection cycle.

The projecting plug 13 protruding from the valve disk 7A of the non-return valve 7 serves to additionally close or plug the axial end opening of the bore 9, so that the lubricant is only allowed to flow into the valve chamber 12 once the non-return valve 7 has traveled through a desired minimum stroke distance, which approximately corresponds to the length of the protruding plug 13 projecting from the valve disk 7A into the bore 9.

The lubricant is then injected from the injection channel 14 into the main channel 0.28, where it is combined into and entrained by the compressed air provided through the pneumatic valve 16 into the main channel 28. The lubricant is carried by the flow of compressed air through the two outlets 44 and 45, and from there is blown through the attached air hoses, pipes or conduits to the respective required lubrication locations. The blowing-out of the main channel 28 is carried out independently of the above described lubricant injection process, based on the actuation of the pneumatic valve 16 under the control of the controller 52. Therefore it is possible, for example, to carry out not only one, but if required several short pneumatic blowing cycles between two successive lubricant injection cycles, in order to convey only a portion of the quantity of lubricant injected into the main channel to the respective lubrication locations with each blowing cycle. Alternatively, it is possible to carry out several lubricant injection cycles before each blowing cycle, to achieve a greater dosed or metered quantity of lubricant.

Each lubricant injection process or cycle, more directly the opening stroke of the non-return valve 7, is detected by the proximity sensor 19 and converted into a corresponding electrical signal emitted on the conductor 50 to the machine control including an evaluating unit 51. There the signal is evaluated, for example, by comparing it to previously stored or defined signal value thresholds, durations, or waveforms. If the sensor 19 emits a signal at all, or especially a signal that is within the normal acceptable parameters, this is evaluated to mean that a proper and sufficient quantity of lubricant has been delivered into the injection channel or main channel. On the other hand, if too little or no lubricant at all is conveyed, for example if the container 15 is empty, then the signal emitted by the sensor 19 will be below the normal threshold, or will not exist at all at the expected time. This will give an indication of a fault or error condition that can cause a stoppage of the associated machine or equipment, or at least provide a fault indication to an operator of the equipment.

The correct dosed or metered quantity of lubricant can, however, only be supplied when the following additional conditions are met. The pneumatic valve 17 must be properly actuated. The pneumatic valve 17 must function properly, and there must be available a supply of pressurized air at a pressure at least equal to or exceeding the adjusted minimum pressure, for example 4 bar. Any defects in the pneumatic valve 17 or in the air supply system will be indirectly detected by the sensor 19, due to the resultant faulty operation or non-operation of the valve 7. Thus, any air leaks in the air supply hose, or the failure of the compressed air supply system will be automatically monitored, detected and indicated. Moreover, the complete lubricant injection mechanism will be monitored by the sensor 19. Any leak in the pneumatic cylinder, i.e. past the pneumatic piston 21, for example due to wear of the piston seals or the like, will be recognized and indicated by the sensor 19, due to the sub-normal or faulty injection of lubricant, and the corresponding sub-normal or faulty stroke travel of the valve 7 being sensed by the sensor 19. The pneumatic blowing-out function is not directly or indirectly monitored by the sensor 19. Instead, the functionality of the pneumatic valve 16 can be directly monitored, for example by measuring the electrical current applied thereto using a separate monitor 53, or by measuring the air flow or pressure in the main channel 28.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A lubricant dosing apparatus for injecting a dosed amount of a lubricant into a pressurized airflow, comprising:
   a lubricant container adapted to contain a lubricant therein;
   a pneumatically actuatable lubricant pump having a pump inlet connected to said lubricant container and having a pump outlet;
   an injection channel connected to said pump outlet;
   a non-return valve that is interposed between said pump outlet and said injection channel and that is adapted to close said pump outlet and to selectively temporarily open said pump outlet responsive to a pressure of the lubricant to allow the lubricant to flow from said pump outlet to said injection channel; and
   an electronic sensor that is arranged adjacent to said non-return valve so as to sense at least one of a position and a stroke travel of said non-return valve, and that is adapted to emit an electrical signal responsive to and indicative of said position or said stroke travel;
   wherein:
   said non-return valve comprises a valve head that selectively covers and uncovers said pump outlet, a protruding valve plug that protrudes from said valve head and that selectively plugs into and unplugs from said pump outlet, and a valve stem that extends from said valve head toward said electronic sensor;
   an axial length of said valve plug protruding from said valve head determines a minimum required magnitude of said stroke travel of said non-return valve for opening said pump outlet; and
   said electronic sensor senses said at least one of said position and said stroke travel of said valve stem of said non-return valve.

2. The lubricant dosing apparatus according to claim 1, wherein said sensor comprises an inductive proximity sensor.

3. The lubricant dosing apparatus according to claim 1, wherein said sensor comprises a capacitive proximity sensor.

4. The lubricant dosing apparatus according to claim 1, further comprising a removable and exchangeable annular spacer disk that is arranged circumferentially around said non-return valve, and that has a thickness which determines a basic spacing distance between said electronic sensor and said non-return valve.

5. The lubricant dosing apparatus according to claim 1, further comprising an electronic evaluating unit and an electrical conductor connecting said electronic sensor to said evaluating unit so as to conduct the electrical signal from said electronic sensor to said evaluating unit, and wherein said evaluating unit is adapted to evaluate the electrical signal and responsive thereto emit an evaluation signal indicative of a proper or improper functioning of said apparatus.

6. The lubricant dosing apparatus according to claim 1, wherein said lubricant pump is a piston pump comprising a cylinder, a pneumatically actuatable piston movably arranged in said cylinder, a needle bushing having a bore therein, and a dosing needle that is movably guidedly arranged in said bore of said needle bushing and that is connected to said piston, wherein said pump inlet communicates into said bore of said needle bushing and said pump outlet communicates out of said bore of said needle bushing, and wherein said piston and said dosing needle together are adapted to repeatedly successively carry out a working stroke, and for each said working stroke a defined dosed quantity of the lubricant flows from said container through said pump inlet into said bore of said needle bushing and is injected from said bore through said pump outlet into said injection channel by said dosing needle.

7. The lubricant dosing apparatus according to claim 6, wherein said defined dosed quantity of the lubricant is a fixed non-adjustable quantity determined by at least one of dimensions of said bore and a stroke distance of said working stroke.

8. The lubricant dosing apparatus according to claim 1, wherein said lubricant pump is a piston pump comprising a cylinder, a pneumatically actuatable piston movably arranged in said cylinder, and a compression spring that applies a pre-stressing force to said piston so as to bias said piston toward a resting position, and wherein said piston is only moved from said resting position to a working position when compressed air, which has at least a defined pressure that is sufficient to apply to said piston an actuating force greater than and oppositely directed than said pre-stressing force, is introduced into said cylinder.

9. The lubricant dosing apparatus according to claim 8, wherein said piston moves from said working position to said resting position due to said pre-stressing force when said defined pressure is relieved, and wherein said lubricant pump injects a dosed quantity of the lubricant from said pump outlet into said injection channel when said piston moves from said working position to said resting position.

10. The lubricant dosing apparatus according to claim 1, further comprising a main channel including a main channel inlet and a main channel outlet, and a first pneumatic valve connected to said main channel inlet so as to selectively provide pressurized air through said main channel inlet into said main channel to form a pressurized airflow flowing through said main channel and out from said main channel outlet, and wherein said injection channel communicates into said main channel so as to introduce the lubricant from said injection channel into the pressurized airflow in said main channel.

11. The lubricant dosing apparatus according to claim 10, further comprising a second pneumatic valve connected to said lubricant pump so as to selectively provide pressurized air to actuate said lubricant pump.

12. The lubricant dosing apparatus according to claim 11, further comprising a single air inlet that is adapted to be connected to an external source of pressurized air, and that communicates with both said first pneumatic valve and said second pneumatic valve.

13. The lubricant dosing apparatus according to claim 11, wherein said first pneumatic valve and said second pneumatic valve are separately actuatable independently of one another.

14. The lubricant dosing apparatus according to claim 11, further comprising a computer controller that is connected for control signal transmission to said first pneumatic valve and to said second pneumatic valve, and that executes a control program to controlledly actuate said first pneumatic valve and said second pneumatic valve.

15. The lubricant dosing apparatus according to claim 11, further comprising a valve monitor connected only to said first pneumatic valve and adapted to monitor a proper or improper operation of said first pneumatic valve.

16. The lubricant dosing apparatus according to claim 1, further comprising an apparatus housing, a lubricant filling port in said housing, and a specialized lubricant fill fitting connected to said housing and communicating into said lubricant filling port, wherein said lubricant container is connected to said housing and has a fill opening communicating with said lubricant filling port.

17. A lubricant dosing apparatus for injecting a dosed amount of a lubricant into a pressurized airflow, comprising:
- a lubricant container adapted to contain a lubricant therein;
- a pneumatically actuatable lubricant pump having a pump inlet connected to said lubricant container and having a pump outlet;
- an injection channel connected to said pump outlet;
- a non-return valve that is interposed between said pump outlet and said injection channel and that is adapted to close said pump outlet and to selectively temporarily open said pump outlet responsive to a pressure of the lubricant to allow the lubricant to flow from said pump outlet to said injection channel;
- an electronic sensor that is arranged adjacent to said non-return valve so as to sense at least one of a position and a stroke travel of said non-return valve, and that is adapted to emit an electrical signal responsive to and indicative of said position or said stroke travel; and
- a removable and exchangeable annular spacer disk that is arranged circumferentially around said non-return valve, and that has a thickness which determines a basic spacing distance between said electronic sensor and said non-return valve.

18. A lubricant dosing apparatus for injecting a dosed amount of a lubricant into a pressurized airflow, comprising:
- a lubricant container adapted to contain a lubricant therein;
- a pneumatically actuatable lubricant pump having a pump inlet connected to said lubricant container and having a pump outlet;
- an injection channel connected to said pump outlet;
- a non-return valve that is interposed between said pump outlet and said injection channel and that is adapted to close said pump outlet and to selectively temporarily open said pump outlet responsive to a pressure of the lubricant to allow the lubricant to flow from said pump outlet to said injection channel;
- an electronic sensor that is arranged adjacent to said non-return valve so as to sense at least one of a position and a stroke travel of said non-return valve, and that is adapted to emit an electrical signal responsive to and indicative of said position or said stroke travel;
- a main channel including a main channel inlet and a main channel outlet;
- a first pneumatic valve connected to said main channel inlet so as to selectively provide pressurized air through said main channel inlet into said main channel to form a pressurized airflow flowing through said main channel and out from said main channel outlet;
- a second pneumatic valve connected to said lubricant pump so as to selectively provide pressurized air to actuate said lubricant pump; and
- a valve monitor connected only to said first pneumatic valve and adapted to monitor a proper or improper operation of said first pneumatic valve;
- wherein said injection channel communicates into said main channel so as to introduce the lubricant from said injection channel into the pressurized airflow in said main channel.

19. The lubricant dosing apparatus according to claim 18, wherein said first pneumatic valve and said second pneumatic valve are separately actuatable independently of one another.

20. The lubricant dosing apparatus according to claim 18, further comprising a computer controller that is connected for control signal transmission to said first pneumatic valve and to said second pneumatic valve, and that executes a control program to controlledly actuate said first pneumatic valve and said second pneumatic valve.

* * * * *